Oct. 13, 1936.  E. E. JOHNSON  2,057,576
MEASURING DEVICE
Filed Oct. 19, 1933
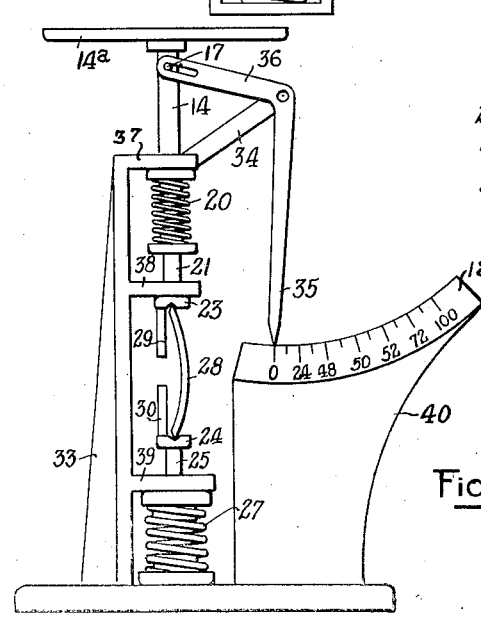
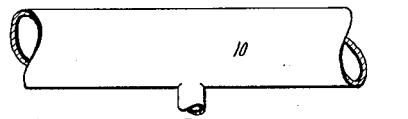
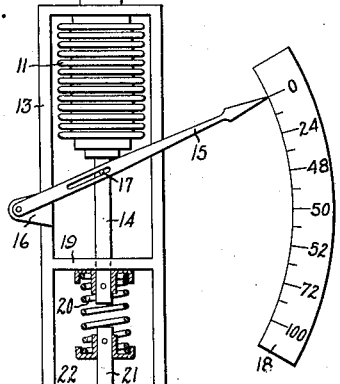
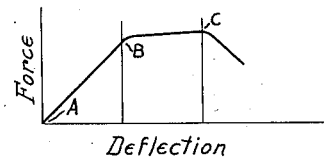
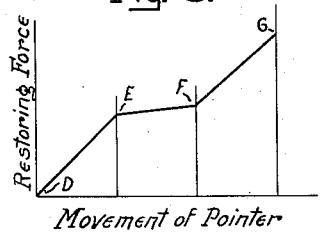
Inventor:
Ernest E. Johnson,
by Harry E. Dunham
His Attorney.

Patented Oct. 13, 1936

2,057,576

UNITED STATES PATENT OFFICE 2,057,576

MEASURING DEVICE

Ernest E. Johnson, Scotia, N. Y., assignor to General Electric Company, a corporation of New York Application October 19, 1933, Serial No. 694,250

9 Claims. (Cl. 73—110)

My invention relates to measuring devices such as those employed to indicate or record measurements, or to effect some controlling operation or other operation in response to a change in the quantity being measured.

The principal object of my invention is to provide a novel and improved restoring force mechanism for deflection type measuring devices and instruments generally to the end that certain selected portions of the deflection or movement of its movable member in response to changes in the quantity being measured may be particularly emphasized. For example, in a measuring instrument of the indicating type my invention makes it possible to have such a movement of the indicating pointer with respect to the graduated scale that over a selected portion of the measuring range it is much easier for one to observe and accurately determine very small changes in the magnitude of the quantity being measured than it is to do this during other portions of the measuring range and still have a good measuring accuracy during these other portions of the measuring range.

It is frequently desirable to have a measuring device which enables one to observe and accurately determine small changes in the magnitude of the quantity being measured when the magnitude varies over a predetermined range without it being necessary or even desirable to do this when the magnitude of this quantity varies outside this range. Furthermore, it is desirable to obtain this highly accurate measuring and indicating function during any desired portion of the operating range of the measuring device without greatly increasing the length of its scale.

My invention provides this desired type of measuring device. Briefly described, my invention consists in providing the measuring device with a novel restoring force mechanism for opposing the movement of its movable element. Assume for the sake of simplicity that in an indicating instrument the scale is stationary and that the indicating pointer is movable. My novel restoring force mechanism is arranged to produce during a portion of its operating range a restoring force which changes a given amount per unit movement of the pointer and at the end of this portion of its operating range its restoring force characteristics almost abruptly change so that during a succeeding portion of its operating range its restoring force changes an amount that is considerably less than the above-mentioned given amount per the above-mentioned unit movement of the pointer. My invention also makes it possible to provide a measuring device with a scale having a series of numbers of increasing values respectively marked thereon adjacent the scale graduations, the numbers being so arranged that over a predetermined portion of its scale the distance between any two consecutive numbers differing by a given amount is as great as the distance between any two numbers differing by a much larger amount situated in other portions of the scale. My invention further makes it possible to arrange the scale so that the pointer moves over the above-mentioned predetermined portion of the scale when the restoring force mechanism operates over that portion of its working range during which it produces a restoring force that changes considerably less per unit movement of the pointer than it does during other portions of its working range. Consequently when the pointer moves over the above-mentioned predetermined portion of the scale it is very easy for one to observe and accurately determine very small changes in the magnitude of the quantity being measured, and at the same time this desired result can be obtained without necessarily crowding the graduation marks in the remaining portions of the scale and without greatly increasing the length of the scale.

My invention however will be best understood from the following description when considered in connection with the accompanying drawing, while those features of my invention which are believed to be novel and patentable are pointed out in the appended claims.

Fig. 1 of the drawing represents a preferred embodiment of my invention applied to a pressure measuring device; Figs. 2 and 3 represent graphs useful in explaining the principles of my invention; Fig. 4 represents a portion of the arrangement shown in Fig. 1 in order to illustrate a slight modification thereof; and Fig. 5 represents a preferred embodiment of my invention applied to a weighing scale. Similar parts in the various figures are represented by the same reference numerals.

In Fig. 1, a pipe represented by 10 contains some fluid under pressure, for example, steam. Assume that it is desired to maintain this steam as nearly as possible at a pressure of 50 pounds, that there is a tendency for the steam pressure to vary slightly to either side of 50 pounds with a maximum variation of 2 pounds to either side, that it is desired to have a pressure measuring device which enables one to observe and accurately determine very small changes in the steam pressure when it varies between 48 and 52 pounds in order that the observer may be better able to take suitable steps to maintain the pressure as nearly as possible at 50 pounds, and further assume that it is desired to be able to measure the steam pressure with only a fair degree of accuracy when it is outside the range of 48–52 pounds. A sylphon bellows 11 is connected to the steam pipe 10 by a small pipe 12. One end of bellows 11 is secured to a frame 13 and to the free end of the bellows is secured a rod 14. It is clear that rod 14 will move up and down in response to variations in the pressure of the steam in pipe 10. A movable indicating pointer 15 is pivoted in an arm 16 of the frame, the pointer having an elongated slot in which a pin 17 secured to rod 14 is adapted to slide. A curved uniformly graduated scale 18 is so positioned that the end of pointer 15 will move adjacent the graduations on its inner periphery during operation of the gauge. A series of numbers are respectively marked on the scale adjacent its graduations as shown, and it can be seen that the distance between the two consecutive numbers 48 and 50 and between the two consecutive numbers 50 and 52 is as large as the distance between any two consecutive numbers in other portions of the scale differing by a much larger amount than the difference between adjacent numbers 48 and 50 and adjacent numbers 50 and 52.

Rod 14 passes through a clearance hole in a wall 19 of the frame and the end of this rod is secured to the upper end of an open coil helical compression spring 20. The lower end of spring 20 is secured to the upper end of a rod 21 which passes through a clearance hole in a wall 22 of the frame and to the lower end of this rod is secured a bearing plate 23 having a V-shaped notch. A similar bearing plate 24 having a V-shaped notch is secured to the upper end of a rod 25 which passes through a clearance hole in a wall 26 of the frame, the lower end of this rod being secured to the upper end of an open coil helical compression spring 27. The lower end of spring 27 is secured to the bottom wall of the frame. A column spring 28 having V-shaped ends and preferably made of steel is placed between plates 23 and 24 with the ends of the spring in the V-shaped notches of the plates as shown. Confronting each other are two rods 29 and 30 respectively secured to plates 23 and 24.

Each of coil springs 20 and 27 has a substantially constant stiffness over its entire operating range. By the spring stiffness I mean the number of pounds force required to change the deflection of the spring a unit amount. Column spring 28 however has peculiar force-deflection characteristics represented for example by the graph shown in Fig. 2. Thus the column spring has a substantially constant stiffness from its free state represented by A in Fig. 2 until it has been deflected a critical amount as represented for example by B in Fig. 2. The critical point B corresponds, I believe, to the point at which the column spring begins appreciably to yield laterally. As soon as the column spring is deflected above its critical deflection value B its stiffness almost abruptly decreases to a considerably lower value and practically remains at this lower value with further deflections thereof until its elastic limit is reached, as shown for example by C in Fig. 2. The great difference between the stiffness of the column spring before and after it has been deflected to its critical deflection value B may be readily seen from the great difference between the slopes of the lines AB and BC. It is therefore clear that the column spring has a critical operating range between its critical deflection value B and its elastic limit C during which its stiffness is considerably lower than from its free state A to its critical deflection value B.

Walls 22 and 26 are so positioned that column spring 28 is initially deflected to its critical deflection force B shown in Fig. 2 and the lengths of rods 14 and 21 in Fig. 1 are such that their confronting ends abut when spring 20 has been sufficiently deflected to produce a force equal to the initial deflection force of the column spring. The lengths of rods 29 and 30 in Fig. 1 are such that their confronting ends abut at or preferably slightly before column spring 28 has been deflected to its elastic limit C in Fig. 2, whereas wall 26 and the bottom wall of the frame are so positioned that spring 27 is initially deflected to exert a force equal to the force exerted by column spring 28 when the latter has been sufficiently deflected to bring the confronting ends of rods 29 and 30 into contact. It is clear that wall 22 prevents column spring 28 from exerting any force downward movement of pointer 15 until spring 20 has been sufficiently deflected to produce a force at least equal to the initial deflection force of the column spring, whereas wall 26 prevents spring 27 from exerting any force to oppose downward movement of the pointer until column spring 28 has been sufficiently deflected to produce a force at least equal to the initial deflection force of the spring 27. Furthermore, the elasticity of the material of column spring 28 and the ratio of its length to its diameter are such that between its critical deflection value B and its elastic limit C as shown in Fig. 2 it has a stiffness which is considerably lower than that of either of springs 20 and 27.

It should now be evident that I have provided a restoring force mechanism for pointer 15 consisting of three springs 20, 28 and 27 so arranged in tandem that when the pointer starts to move downward from its illustrated position its movement is first opposed only by spring 20 which has a given value of stiffness. After the pointer has moved a predetermined distance in opposition to spring 20, further movement of the pointer is then opposed by column spring 28 having during its effective operating range a much lower stiffness than that of spring 20, and after the pointer has moved a predetermined distance in opposition to the column spring, further movement of the pointer is opposed by coil spring 27 having a much higher stiffness than that of the column spring during the effective operating range of the latter. It should therefore be clear that my restoring force mechanism has a restoring force-movement characteristic as represented by the graph shown in Fig. 3 wherein the lines DE, EF and FG respectively represent the restoring force-movement characteristics of springs 20, 28 and 27 during their respective operating ranges. By comparing the slope of line EF in Fig. 3 to the slopes of lines DE and FG it becomes evident that the restoring force of colnum spring 28 changes considerably less per unit movement of pointer 15 than that of either of springs 20 and 27.

A description of the operation of the measuring device illustrated in Fig. 1 follows: Assume that at this instant the steam in pipe 10 is at atmospheric pressure but that its pressure is gradually increasing. Rod 14 and therefore pointer 15 will move downward as the steam pressure increases. The movement of pointer 15 is at first opposed only by spring 20 and the pointer moves a given amount per unit increase in steam pressure. When the steam pressure has increased to 48 pounds, spring 20 is sufficiently deflected so that it produces a force equal to the initial deflection force of column spring 28 and so that the confronting ends of rods 14 and 21 abut. Consequently, as soon as the steam pressure increases slightly above 48 pounds, column spring 28 begins to oppose the downward movement of pointer 15 and since the column spring has during its effective operating range a much lower stiffness than spring 20 the pointer will move a much larger amount per unit change in steam pressure than it did when the pressure was increasing from 0 to 48 pounds. This considerably larger movement of pointer 15 per unit increase in steam pressure will continue until the steam pressure has increased to 52 pounds because at this pressure column spring 28 is sufficiently deflected to produce a force equal to the initial deflection force of spring 27 and to cause the confronting ends of rods 29 and 30 to abut. Hence as the steam pressure increases above 52 pounds spring 27 begins to oppose the downward movement of pointer 15 and since this spring has a much higher stiffness than that of column spring 28 during the effective operating range of the latter, the pointer will move a much smaller amount per unit increase in steam pressure than it did when the pressure was increasing from 48 to 52 pounds. It will be noted that the abutting of the confronting ends of rods 29 and 30 also prevent a deflection of column 28 beyond its elastic limit. Obviously the above described relationship between the pointer movement and steam pressure will also be true when the pressure is decreasing instead of increasing. It should be clear that when under normal operating conditions the steam pressure is being maintained as closely as possible at 50 pounds, it is readily possible for one to observe and accurately determine very small changes in the pressure when it varies between 48 and 52 pounds and still measure with a fair degree of accuracy the steam pressure below 48 pounds and above 52 pounds.

During the above described operation the confronting ends of rods 14 and 21 abut when spring 20 has been sufficiently deflected so that before its coils abut it exerts a force equal to the initial deflection force of column spring 28. However it is possible to obtain the same results by having rods 14 and 21 sufficiently short so that their confronting ends do not abut even when spring 20 is sufficiently deflected so that all of its coils abut and by designing this spring so that when all of its coils abut the spring exerts a force equal to the initial deflection force of column spring 28.

In Fig. 4 I illustrate a slight modification of the arrangement shown in Fig. 1. This modification consists in placing an open coil helical compression spring 31 having a substantially constant stiffness between bearing plates 23 and 24 in addition to the column spring 28 in order to change the restoring force movement characteristics of the restoring force mechanism shown in Fig. 1 during that portion of its operating range when column spring 28 opposes movement of pointer 15. This change in characteristics is obtained by employing a coil spring 31 having a stiffness different from that of column spring 28 during the effective operating range of the latter. In this manner it is possible with the arrangement shown in Fig. 4 to obtain a movement of pointer 15 per unit change in steam pressure between 48 and 52 pounds which is different from that obtained with the device shown in Fig. 1, otherwise the operation of the two arrangements are identical.

In Fig. 5 I have shown my invention applied to a weighing scale. This weighing scale comprises a plate 14a on which the article to be weighed is placed, the rod 14 being secured to this plate. A frame 33 has an outwardly extending arm 34 in which is pivoted a pointer 35, the pointer having an arm 36 extending therefrom in which there is an elongated slot engaging the pin 17 secured to rod 14. The frame has three brackets 37, 38 and 39 which have clearance holes through which pass rods 14, 21 and 25 respectively. The frame has a bracket 40 for supporting scale 18. The brackets 37, 38 and 39, and the springs 20, 28 and 27 and their associated parts are arranged in the same manner as the corresponding parts are arranged in the device shown in Fig. 1, hence it is clear that the device shown in Fig. 5 will operate in the same manner as the device shown in Fig. 1 except that it will indicate the weight of an article placed on its plate 14a instead of indicating the pressure of a fluid.

Although I have illustrated certain specific applications of my invention it will be clear from these illustrations that my invention is not limited thereto but may be applied to any measuring device employing a restoring force mechanism.

In accordance with the provisions of the patent statutes I have described the principles of operation of my invention, together with the apparatus which I now consider to represent the best embodiments thereof, but I desire to have it understood that the apparatus shown and described is only illustrative, and that the invention may be carried out by other means.

What I claim as new and desire to secure by Letters Patent of the United States is:

1. In a measuring device, the combination of a member movable in response to a change in the measurement, and a spring restoring force mechanism for opposing movement of said movable member, said mechanism comprising a spring having a substantially constant stiffness over its entire operating range, another spring having over at least a predetermined portion of its operating range, a stiffness which is considerably lower than that of the first mentioned spring, and stop means for initially deflecting one of said springs to cause it to exert a predetermined force and for making it incapable of exerting this initial deflection force to oppose movement of said movable member until the other spring has been sufficiently deflected so that it exerts a force at least equal to the initial deflection force exerted by said one of said springs, said springs being so arranged that the second mentioned spring operates over said predetermined portion of its operating range during some portion of the operating range of said mechanism.

2. In a measuring device, the combination of a member movable in response to a change in the measurement, and a spring restoring force mechanism for opposing movement of said movable member, said mechanism comprising two springs arranged in tandem, one of said springs having a substantially constant stiffness over its entire operating range and the other spring having over at least a predetermined portion of its operating range a stiffness which is considerably lower than that of the first mentioned spring, and stop means for initially deflecting the rear spring to cause it to exert a predetermined force and for making it incapable of exerting this initial deflection force to oppose movement of said movable member until the front spring has been sufficiently deflected so that it exerts a force at least equal to the initial deflection force exerted by the rear spring, said springs being so arranged that the second mentioned spring operates over said predetermined portion of its operating range during some portion of the operating range of said mechanism.

3. In a measuring device, the combination of a member movable in response to a change in the measurement, and a spring restoring force mechanism for opposing movement of said movable member, said mechanism comprising two springs arranged in tandem, one of said springs having a substantially constant stiffness over its operating range and the other spring having over at least a predetermined portion of its operating range a stiffness which is considerably lower than that of the first mentioned spring, stop means for initially deflecting the rear spring to cause it to exert a predetermined force and for making it incapable of exerting this initial deflection force to oppose movement of said movable member until the front spring has been sufficiently deflected so that it exerts a force at least equal to the initial deflection force exerted by the rear spring, and stop means for preventing further deflections of the front spring when it exerts a force at least equal to the initial deflection force exerted by the rear spring, said springs being so arranged that the second mentioned spring operates over said predetermined portion of its operating range during some portion of the operating range of said mechanism.

4. In a measuring device, the combination of a member movable in response to a change in measurement, and a spring restoring force mechanism for opposing movement of said movable member, said mechanism comprising a spring having a substantially constant stiffness over its entire operating range arranged in tandem with a column spring having two critical deflection values between which its stiffness is considerably lower than that of the first mentioned spring, and stop means for initially deflecting the rear spring to cause it to exert a predetermined force and for making it incapable of exerting this initial deflection force to oppose movement of said movable member until the front spring has been sufficiently deflected so that it exerts a force at least equal to the initial deflection force of the rear spring, said springs being so arranged that said column spring operates between its two critical deflection values during some portion of the operating range of said mechanism.

5. In a measuring device, the combination of a member movable in response to a change in the measurement, and a spring restoring force mechanism for opposing movement of said movable member, said mechanism comprising a coil spring having a substantially constant stiffness over its entire operating range, a column spring having a practically constant stiffness from its free state until a critical deflection thereof at which its stiffness almost abruptly decreases to a considerably lower value for deflections thereof until its elastic limit is reached, said column spring having between its critical deflection value and its elastic limit a stiffness considerably lower than that of said coil spring, said springs being arranged in tandem with the coil spring in the front and the column spring in the rear, stop means for initially deflecting said column spring to its critical deflection value and for making it incapable of exerting this initial deflection force to oppose movement of said movable member until said coil spring has been sufficiently deflected so that it exerts a force at least equal to the initial deflection force of said column spring, and stop means for preventing a deflection of said column spring beyond its elastic limit and for preventing further deflection of said coil spring when it exerts a force at least equal to the initial deflection force exerted by said column spring.

6. In a measuring device, the combination of a member movable in response to a change in the measurement, and a spring restoring force mechanism for opposing movement of said movable member, said mechanism comprising three springs arranged in tandem, the front and rear springs each having a substantially constant stiffness over its operating range and the middle spring having over at least a portion of its operating range a stiffness which is considerably lower than that of either of the other two springs, stop means for initially deflecting the middle spring to cause it to exert a predetermined force and for making it incapable of exerting this initial deflection force to oppose movement of said movable member until the front spring has been sufficiently deflected so that it exerts a force at least equal to the initial deflection force exerted by the middle spring, and stop means for initially deflecting the rear spring to cause it to exert a predetermined force and for making it incapable of exerting this initial deflection force to oppose movement of said movable member until the middle spring has been sufficiently deflected beyond its initial deflection value so that it exerts a force at least equal to the initial deflection force of the rear spring, said springs being so arranged that the middle spring operates over said predetermined portion of its operating range during some portion of the operating range of said mechanism.

7. In a measuring device, the combination of a member movable in response to a change in the measurement, and a spring restoring force mechanism for opposing movement of said movable member, said mechanism comprising two coil springs each having a substantially constant stiffness over its operating range, a column spring having a practically constant stiffness from its free state until a critical deflection value thereof at which its stiffness almost abruptly decreases to a considerably lower value for deflections thereof until its elastic limit is reached, said column spring having between its critical deflection value and its elastic limit a stiffness considerably lower than that of either of said two coil springs, said springs being arranged in tandem with the column spring between the two coil springs, stop means for initially deflecting the column spring to its critical deflection value and for making it incapable of exerting this initial deflection force to oppose movement of said movable member until the front coil spring has been sufficiently deflected so that it exerts a force at least equal to the initial deflection force exerted by the column spring, stop means for initially deflecting the rear coil spring to cause it to exert a predetermined force and for making it incapable of exerting this initial deflection force to oppose movement of said movable member until the column spring has been sufficiently deflected beyond its critical deflection value so that it exerts a force at least equal to the initial deflection force of the rear spring, and stop means for preventing further deflection of the front coil spring when it exerts a force at least equal to the initial deflection force exerted by said column spring and for preventing a deflection of said column spring beyond its elastic limit.

8. In a measuring device, the combination of a stationary graduated scale, a movable indicating pointer cooperating with said scale, and a spring restoring force mechanism for opposing movement of said pointer, said mechanism comprising two springs arranged in tandem, one of said springs having a substantially constant stiffness over its entire operating range and the other spring having over at least a predetermined portion of its operating range a stiffness which is considerably lower than that of the first mentioned spring, and stop means for initially deflecting the rear spring to cause it to exert a predetermined force and for making it incapable of exerting this initial deflection force to oppose movement of said pointer until the front spring has been sufficiently deflected so that it exerts a force at least equal to the initial deflection force exerted by the rear spring, said springs being so arranged that the second mentioned spring operates over said predetermined portion of its operating range during some portion of the operating range of said mechanism, said scale having a series of numbers of increasing values respectively marked thereon adjacent its graduations, said numbers being so arranged that over a predetermined portion of the scale the distance between any two consecutive numbers differing by a given amount is as great as the distance between any two consecutive numbers differing by a much larger amount situated in other portions of said scale, and said scale being so arranged that the pointer moves over said predetermined portion of said scale when the second mentioned spring operates over said predetermined portion of its operating range.

9. A measuring device comprising in combination, a movable member, means for exerting a force thereon and effecting movement thereof in response to variations in magnitude of a quantity to be measured, a spring having a relatively great uniform stiffness, a spring having a variable stiffness changing abruptly from a relatively great value to a relatively small value at a critical point after its initial deflection has taken place, and means for maintaining said variable stiffness spring deflected to said critical point, said springs being connected in tandem to oppose motion of said movable members, whereby said measuring device has a relatively great sensitivity corresponding to deflections of said variable stiffness spring beyond its critical point.

ERNEST E. JOHNSON.